(12) United States Patent
Hirose et al.

(10) Patent No.: US 8,452,424 B2
(45) Date of Patent: May 28, 2013

(54) MOVING OBJECT FEED-FORWARD CONTROL METHOD

(75) Inventors: Noriaki Hirose, Ogaki (JP); Hiromu Hirai, Nagoya (JP); Kenta Seki, Nagoya (JP)

(73) Assignee: National Univeristy Corporation Nagoya Institute of Technology, Nagoya (JP)

( * ) Notice: Subject to any disclaimer, the term of this patent is extended or adjusted under 35 U.S.C. 154(b) by 276 days.

(21) Appl. No.: 12/920,385

(22) PCT Filed: Feb. 26, 2009

(86) PCT No.: PCT/JP2009/053527
§ 371 (c)(1),
(2), (4) Date: Dec. 21, 2010

(87) PCT Pub. No.: WO2009/110368
PCT Pub. Date: Sep. 11, 2009

(65) Prior Publication Data
US 2011/0087340 A1    Apr. 14, 2011

(30) Foreign Application Priority Data

Mar. 5, 2008    (JP) .................. 2008-054252

(51) Int. Cl.
G05B 13/02    (2006.01)
G05B 19/18    (2006.01)
B60K 6/36    (2007.10)
H02K 7/10    (2006.01)
H02K 41/00    (2006.01)

(52) U.S. Cl.
USPC .............. 700/29; 700/44; 700/55; 700/56; 318/9; 318/13; 318/135

(58) Field of Classification Search
USPC ............ 318/9, 13, 135, 283, 286, 618, 632, 318/638; 700/29, 44, 45, 55
See application file for complete search history.

(56) References Cited

U.S. PATENT DOCUMENTS 5,710,497 A     1/1998  Yanagimachi
5,757,149 A *   5/1998  Sato et al. .............. 318/135

(Continued)

FOREIGN PATENT DOCUMENTS

JP    A-08-255023    10/1996
JP    A-2001-249702    9/2001

(Continued)

OTHER PUBLICATIONS

International Search Report in International Application No. PCT/JP2009/053527; dated Apr. 14, 2009 (with English-language translation).

(Continued)

*Primary Examiner* — Kavita Padmanabhan
*Assistant Examiner* — Darrin Dunn
(74) *Attorney, Agent, or Firm* — Oliff & Berridge, PLC

(57) ABSTRACT

In a case where a position command path for a control position of a load 5 that is equivalent to a moving object is set by issuing a position command Rc(z), a gain for one of a high-frequency component, a specified frequency, and a specified frequency width is constrained. This means that a resonant frequency can be constrained, and that after the position command Rc(z) arrives at a target position, a position detection signal Y(z) can also arrive at the target position in a set number of steps. It is therefore possible to perform positioning at high speed and with high precision by constraining a resonance mode of a mechanism that includes the moving object, and a feed-forward control can be performed that meets target positioning times that are set for various types of operating patterns.

2 Claims, 6 Drawing Sheets

U.S. PATENT DOCUMENTS

| | | | |
|---|---|---|---|
| 6,847,598 B2 * | 1/2005 | Ikai | 369/44.34 |
| 2001/0006438 A1 | 7/2001 | Nakagawa et al. | |
| 2002/0176201 A1 * | 11/2002 | Hsin et al. | 360/78.05 |
| 2004/0183494 A1 | 9/2004 | Nagaoka et al. | |
| 2005/0285558 A1 | 12/2005 | Watt et al. | |
| 2006/0254346 A1 * | 11/2006 | Salapaka et al. | 73/105 |
| 2009/0309649 A1 * | 12/2009 | Tsuyama | 327/557 |
| 2009/0316294 A1 * | 12/2009 | Iwashiro | 360/75 |

FOREIGN PATENT DOCUMENTS

| | | |
|---|---|---|
| JP | A-2004-272883 | 9/2004 |
| JP | A-2007-200463 | 8/2007 |
| JP | A-2007-537549 | 12/2007 |
| JP | A-2008-310651 | 12/2008 |

OTHER PUBLICATIONS

Written Opinion of International Searching Authority in International Application No. PCT/JP2009/053527; dated Apr. 14, 2009 (with partial English-language translation).

International Preliminary Report on Patentability in International Application No. PCT/JP2009/053527; dated Mar. 5, 2010 (with English-language translation).

* cited by examiner

MOVING OBJECT FEED-FORWARD CONTROL METHOD

TECHNICAL FIELD

The present invention relates to a moving object feed-forward control method that quickly moves a load that is a moving object to a target position, by motor drive, for example.

BACKGROUND ART

A technique is generally known that, in order to meet control specifications for a control device for a moving object, configures a feed-forward control method by applying a control method with two degrees of freedom to a feedback control system. In particular, a feed-forward control method for a mechatronic device that has a high-order resonance mode requires a technique for arriving at a target position within a required target positioning time without exciting a high-order vibration mode.

In Japanese Patent Application Publication No. JP-A-2001-249702, a technique for this purpose is disclosed that, by using multiple rates for a control input cycle, combines an inverse model design and a target path design that takes vibration suppression into account. In a positioning control device for a moving object, in a case where a positioning operation is performed in a frequency band that is close to a resonant frequency, it is essential to generate a control input that suppresses the resonant frequency and a high-frequency component. However in the case of the present technique, a problem occurs in that the target path must be designed in advance, which is impractical, because it makes it impossible to assign the target path freely.

Therefore, in Japanese Patent Application Publication No. JP-A-08-255023, Japanese Patent Application Publication No. JP-A-2007-200463, and Japanese Patent Application Publication No. JP-A-2004-272883, a technique is proposed by which a feed-forward control is performed by inputting a position command path to a digital filter. Further, in Japanese Patent Application Publication No. JP-A-08-255023, a technique is disclosed that speeds up convergence on the target position by determining a factor in a polynomial expression for the digital filter by minimizing an evaluation function, and that shortens the positioning time by improving a transient response.

SUMMARY OF THE INVENTION

However, even the feed-forward control techniques that are described in Japanese Patent Application Publication No. JP-A-08-255023, Japanese Patent Application Publication No. JP-A-2007-200463, and Japanese Patent Application Publication No. JP-A-2004-272883 simply input the position command path to the digital filter and determine the factor in the polynomial expression for the digital filter by minimizing the evaluation function. Therefore, although a freely assigned target path can be handled, it is not possible to cause a position detection signal to arrive at the target position in a set number of steps.

The present invention addresses these issues and provides a feed-forward control method that is able to handle a freely assigned target path and can cause the position detection signal to arrive at the target position in a set number of steps.

In order to address the issues, according to a first aspect, the present invention provides a moving object feed-forward control method that is used for a positioning control that positions a moving object ($5$) among a plurality of control objects ($2$ to $5$), and that computes a control input ($U(z)$) of a feed-forward control for the moving object ($5$) by inputting a position command ($Rc(z)$) to a digital filter that is configured from a finite impulse response filter ($Nf(z)/Z^n$). The moving object feed-forward control method is characterized in that a numerator polynomial expression ($Nf(z)$) of the finite impulse response filter ($Nf(z)/Z^n$) includes a root of a denominator polynomial expression ($D(z)$) for a transfer function model in a discrete-time system of the control objects ($2$ to $5$), and setting a coefficient ($a_k$) of the numerator polynomial expression ($Nf(z)$) of the finite impulse response filter ($Nf(z)/Z^n$) by making an evaluation function ($J$) that is a quadratic form of the coefficient ($a_k$) as small as possible causes the moving object ($5$), after the position command ($Rc(z)$) arrives at a target position, to arrive at the target position in a number of steps that is a degree ($n$) of the finite impulse response filter ($Nf(z)/Z^n$).

Issuing the position command ($Rc(z)$) thus makes it possible to compute the feed-forward control input ($U(z)$), which constrains a gain for one of a high-frequency component, a specified frequency, and a specified frequency width. This means that a resonant frequency can be constrained, and that after the position command ($Rc(z)$) arrives at the target position, the moving object ($5$) can also arrive at the target position in the set number of steps. It is therefore possible to perform the positioning at high speed and with high precision by constraining a resonance mode of the mechanism that includes the moving object ($5$), and a feed-forward control can be performed that meets target positioning times that are set for various types of operating patterns.

For example, as described in a second aspect, in a case where the gain of the finite impulse response filter ($Nf(z)/Z^n$) at a specified frequency is reduced, the specified frequency may be defined as being within a range of ±10% from a resonant frequency that generates resonant vibration in the control objects ($2$ to $5$). In this case, as described in a third aspect, a weighting matrix ($Q_{fk}$) that performs constraint of the specified frequency in a positive definite matrix ($Q$) of the evaluation function ($J$) can be determined by substituting the specified frequency into a function that is expressed by the square of the gain characteristic of the finite impulse response filter ($Nf(z)/Z^n$).

Furthermore, as described in a fourth aspect, in a case where the gain of the finite impulse response filter ($Nf(z)/Z^n$) in a specified frequency width is reduced, the specified frequency width may include the resonant frequency that generates resonant vibration in the control objects ($2$ to $5$). In this case, as described in a fifth aspect, the weighting matrix ($Q_{fk}$) that performs constraint of the specified frequency in a positive definite matrix ($Q$) of the evaluation function ($J$) can be determined by integrating, for the specified frequency width, the function that is expressed by the square of the gain characteristic of the finite impulse response filter ($Nf(z)/Z^n$).

Note that the reference numerals in parentheses for the various units that are described above indicate correspondence relationships with specific units that are described later in the embodiments.

DETAILED DESCRIPTION OF THE EMBODIMENTS

Hereinafter, embodiments of the present invention will be explained based on the drawings.

First Embodiment

Figure 1:
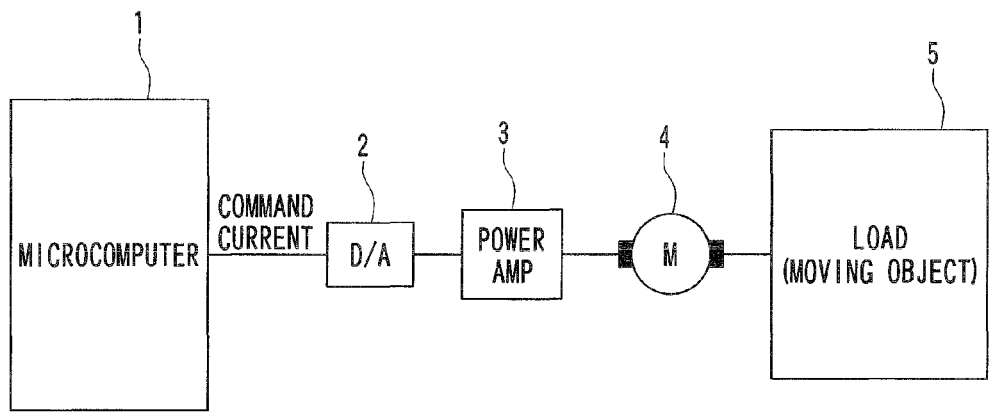
FIG. 1 is a block diagram of a control system that implements a feed-forward control method according to a first embodiment of the present invention.

FIG. 1 is a block diagram of a control system that implements a feed-forward control method according to a first embodiment. As shown in FIG. 1, in the present embodiment, a command current from a microcomputer 1 that configures a control device is converted by a D/A converter 2, after which the current flows to a motor 4 through a power amp 3 that includes a current control. By turning the motor 4, a load 5 is driven, such that an operation of positioning the load 5 is performed, the positioning operation being, for example, an adjustment of the angle of the load 5 in conjunction with the turning of the motor 4, an adjustment of the position of the load 5 in an axial direction when the turning of the motor 4 is converted into movement in the axial direction, or the like. That is, in the present embodiment, the load 5 is defined as a moving object, and a control is performed that positions the moving object at a target position, but as a part of the control, a feed-forward control is performed that suppresses a resonance mode of a mechanism that includes the moving object and meets target positioning times that are set for various types of operating patterns, such that the positioning can be performed at high speed and with high precision.

Specifically, the feed-forward control is performed such that, in a case where a position command path is set for the control position of the load 5 in accordance with the type of the operating pattern, the position command is made to arrive at the target position by controlling the resonant vibration, after which the actual output current arrives at the target position within the set positioning time.

Figure 2:
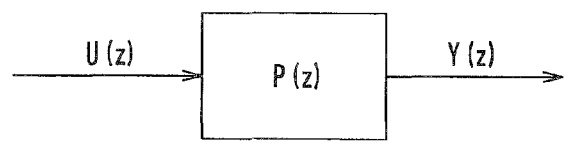
FIG. 2 is a block diagram that shows, as a discrete-time system, a control object that is shown in FIG. 1.
Figure 3:
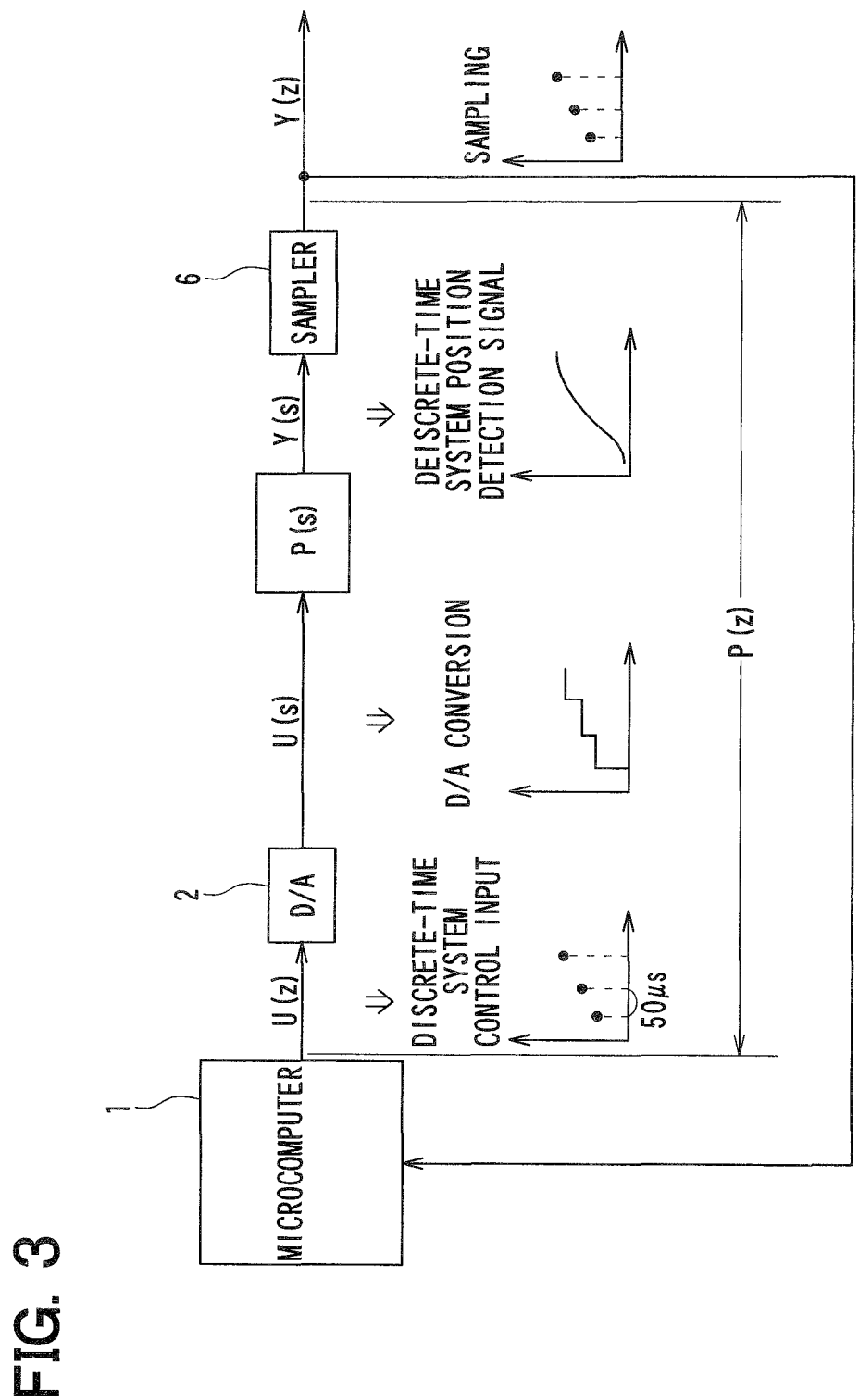
FIG. 3 is a block diagram that shows, as a continuous-time system, the discrete-time system that is shown in FIG. 2.

In the case of the present embodiment, the turning of the motor 4 is controlled by the outputting of the command current from the microcomputer 1, but the command current that can be output from the microcomputer 1 is varied only once in each control cycle (computation cycle) of the microcomputer 1. In other words, including the microcomputer 1 in the system makes the system a discrete-time system, which is expressed by a Z-transform, such that, as shown by a block diagram in FIG. 2, the command current that is output by the microcomputer 1 can be expressed as a control input U(z), and a position detection signal of the load 5 can be expressed as Y(z), while a transfer function for the control input U(z) and the position detection signal Y(z) can be expressed as P(z). If this is converted to a continuous-time system, it can be expressed as a configuration diagram like that in FIG. 3. In other words, it is equivalent to a system in which, if a zero-order hold is applied by the D/A converter 2 in a specified sampling cycle (for example, 50 μs), the control input U(z) that is expressed by the discrete-time system is expressed as a control input U(s) in an s region, such that a transfer function P(s) generates a position detection signal Y(s), and if sampling is performed by a sampler 6 on a specified cycle, the position detection signal Y(s) is expressed as the position detection signal Y(z) after Z-transform.

For example, the transfer function P(s) from the control input U(s) to the position detection signal Y(s) is expressed by the equation below.

$$P(s) = e^{-Ls} K_p \left( \frac{1}{s^2} + \sum_{k=1}^{1} \frac{K_k}{s^2 + 2\zeta_k \omega_k s + \omega_k^2} \right) \quad \text{Equation 1}$$

Figure 4:
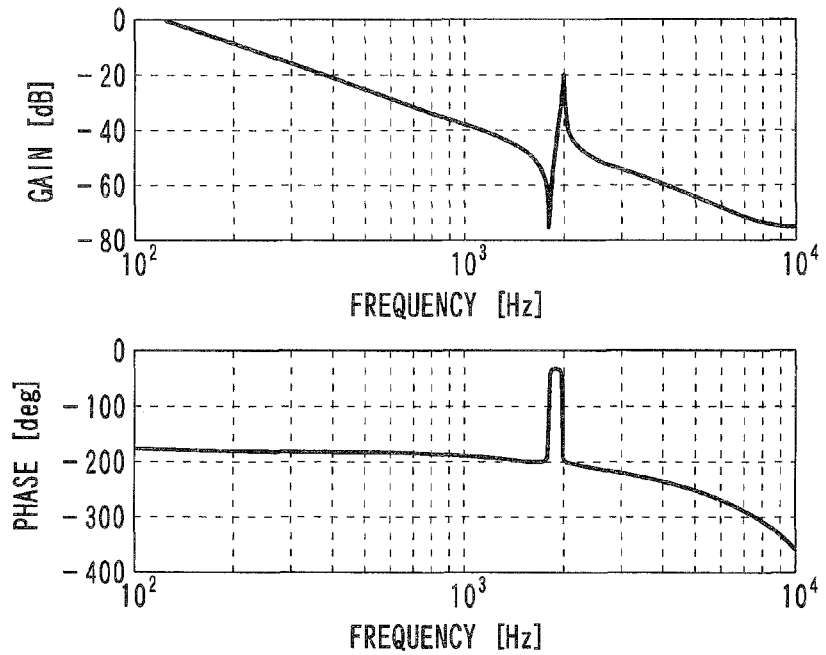
FIG. 4 is a figure that shows a frequency response of a transfer function P(s).

Here, Kp is a gain (kt/J) that includes a torque constant kt and a moment of inertia Jm, L is the lost time, $\zeta_k$ is an attenuation coefficient, $\omega_k$ is a resonant frequency, and Kk is the gain. The frequency response of the transfer function P(s) is as shown in FIG. 4.

Further, in the control system, a digital filter is designed to perform feed-forward control compensation, such that the position command path arrives at the target position in the number of steps of the digital filter.

Figure 5:
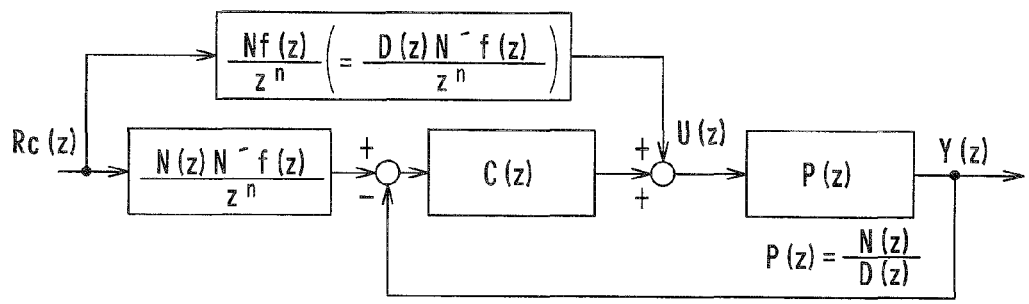
FIG. 5 is a block diagram that shows an overview of overall control in the control system according to the present embodiment.

FIG. 5 is a block diagram that shows an overview of overall control in the control system according to the present embodiment. As shown in FIG. 5, the control input U(z) of the feed-forward control is expressed using a given position command rc and the digital filter, and serves as a control state that takes into consideration a feedback control compensation that is actually used. The method by which the feed-forward control rule in the digital filter is derived will be explained.

First, as described above, the transfer function P(z) is used by the Z-transform to express the position detection signal Y(z) as the control input U(z), and based on the fact that the transfer function P(z) is expressed as a fraction, the position detection signal Y(z) can be expressed as in Equation 2.

$$Y(z) = P(z)U(z) = \frac{N(z)}{D(z)} U(z) \quad \text{Equation 2}$$

Here, N(z) and D(z) respectively express the numerator and the denominator of the transfer function P(z), and because the transfer function P(z) is expressed with both the numerator and the denominator being polynomial expressions, N(z) is the numerator polynomial expression, and D(z) is the denominator polynomial expression.

Furthermore, using a position command Rc(z) that is a Z-transform of the given position command rc, as well as a finite impulse response filter $Nf(z)/Z^n$, the control input U(z) of the feed-forward control is expressed by Equation 3. Note that the given position command rc, in a case where the microcomputer 1 has a hierarchical structure, for example, is a value that is computed before the feed-forward control compensation or the like is performed at the top level, and the control input U(z) is computed in relation to the position command rc by performing one of the feed-forward control compensation and the feedback control compensation. The given position command rc differs according to the configuration of the control system.

$$U(z) = \frac{N_f(z)}{z^n} R_c(z) \qquad \text{Equation 3}$$

The finite impulse response filter $Nf(z)/Z^n$ that is shown in Equation 3 determines the feed-forward control rule in the digital filter. The derivation of the finite impulse response filter $Nf(z)/Z^n$ is performed as described below.

Specifically, if all of the roots of the denominator polynomial expression D(z) in N(z)/D(z), which is equivalent to the transfer function P(z) of the discrete-time system, are included in the numerator polynomial expression Nf(z) in the finite impulse response filter Nf(z)/Zn, the numerator polynomial expression Nf(z) is expressed by Equation 4. Note that in Equation 4, N'f(z) indicates an unknown polynomial expression.

$$N_f(z) = D(z) N'_f(z) \qquad \text{Equation 4}$$

Here, if the control input U(z) as expressed in Equation 3 is substituted for the control input U(z) as expressed in Equation 2, the second equation in Equation 5 is formed, and if the numerator polynomial expression Nf(z) is then converted as in Equation 4, the third equation in Equation 5 is formed. When the denominator polynomial expressions D(z) in both the numerator and the denominator cancel each other out in the third equation, a fourth equation can be derived in which the denominator polynomial expression D(z) has been eliminated.

$$\begin{aligned} Y(z) &= \frac{N(z)}{D(z)} \cdot \frac{N_f(z)}{z^n} R_c(z) \\ &= \frac{N(z)}{D(z)} \cdot \frac{D(z) N'_f(z)}{z^n} R_c(z) \\ &= \frac{N(z) N'_f(z)}{z^n} R_c(z) \end{aligned} \qquad \text{Equation 5}$$

Furthermore, in the second equation in Equation 5, in order for the position detection signal Y(z), which is equivalent to the degree of $Nf(z)/z^n$, to reach the target position at a step n after the position command Rc(z) reaches the target position, it is necessary to fulfill Equation 6. That is, in the relationship between the position command Rc(z) and the position detection signal Y(z), the target position for the position command Rc(z) and the target position for the position detection signal Y(z) coincide after the step n, so it is necessary to set the gain from the position command Rc(z) to the position detection signal Y(z) to 1 at 0 Hz, that is, at z=1 in the z region. Therefore, when 1 is substituted for z in the second equation in Equation 5, the value of the equation becomes 1.

$$\frac{N(1) N_f(1)}{D(1)} = 1 \qquad \text{Equation 6}$$

Two constraint conditions are thus established: (1) all of the roots of the denominator polynomial expression D(z) must be included in the numerator polynomial expression Nf(z), and (2) Equation 6 must be fulfilled. When these constraint conditions are expressed as mathematical formulas, they are expressed as described below.

First, the constraint condition (1), that all of the roots of the denominator polynomial expression D(z) must be included in the numerator polynomial expression Nf(z), will be expressed as a mathematical formula.

Using a real undetermined coefficient ak (k=1, 2, . . . , n), the numerator polynomial expression Nf(z) in the finite impulse response filter $Nf(z)/Z^n$ can be expressed as in Equation 7.

$$N_f(z) = a_n z^n + a_{n-1} z^{n-1} + \ldots + a_1 z + a_0 \qquad \text{Equation 7}$$

Here, if the roots of the denominator polynomial expression D(z) are defined as λk (k=1, 2, . . . , m), the constraint condition that all of the roots of the denominator polynomial expression D(z) must be included in the numerator polynomial expression Nf(z) is expressed as in Equation 8.

$$a_n \lambda_k^n + a_{n-1} \lambda_k^{n-1} + \ldots + a_1 \lambda_k + a_0 = 0 \qquad \text{Equation 8}$$

However, in a case where each of the roots of the denominator polynomial expression D(z) has a multiplicity of 1, that is, where a root λx of the same value is included, the same single constraint expression is derived that is expressed by substituting the root λx into Equation 8. Therefore, in a case where the root λx of the multiplicity of 1 of the root of the denominator polynomial expression D(z) is included, the root λx is used instead of the constraint expression that is expressed by the derivative value of Equation 8. In other words, when there is no constraint expression for a number that corresponds to a number of variables that are to be derived, those variables cannot be derived. Therefore, using the constraint expression that is expressed by the derivative value of Equation 8 satisfies the constraint expression number that corresponds to the number of variables.

$$\begin{aligned} & a_n \lambda_x^n + a_{n-1} \lambda_x^{n-1} + \ldots + a_1 \lambda_x + a_0 = 0 \\ & n a_n \lambda_x^{n-1} + (n-1) a_{n-1} \lambda_x^{n-2} + \ldots + a_1 = 0 \\ & \vdots \\ & {}_n P_{l-1} a_n \lambda_x^{n-(l-1)} + {}_{n-1} P_{l-1} a_n \lambda_x^{n-l} + \ldots \ldots + {}_{l-1} P_{l-1} a_{l-1} = 0 \end{aligned} \qquad \text{Equation 9}$$

Next, the constraint condition (2), that Equation 6 must be fulfilled, will be expressed as a mathematical formula. If the same method of expression is used as was used for the constraint condition (1) above, the Equation 6 constraint condition is expressed by a constraint expression like Equation 10. That is, Equation 10 is derived by moving everything in Equation 6 to the right side, except for Nf(1), and then substituting 1 for z in Equation 7.

$$a_n + a_{n-1} + \ldots + a_1 + a_0 = \frac{D(1)}{N(1)} \qquad \text{Equation 10}$$

However, in a case where 1 is included among the roots of the denominator polynomial expression D(z), it is not possible to compute Equation 10. Accordingly, if the root 1 of multiplicity q is included in the roots of the denominator polynomial expression D(z) by l'Hospital's rule, then Equa tion 11, instead of Equation 10, defines the constraint expression.

$$_nP_q a_n + {}_{n-1}P_q a_n + \ldots + {}_q P_q a_q = \frac{\lim\limits_{z \to 1} \frac{d^q}{dz^q} D(z)}{N(1)} \quad \text{Equation 11}$$

In Equation 8 and Equation 10 that are described above, if it is assumed that multiple roots and the real root 1 are not included in the roots of the denominator polynomial expression D(z), then the constraint expressions in Equations 8 and 10 can be consolidated as in Equation 12.

$$\begin{bmatrix} \lambda_1^n & \lambda_1^{n-1} & \ldots & \lambda_1^1 & 1 \\ \lambda_2^n & \lambda_2^{n-1} & \ldots & \lambda_2^1 & 1 \\ \vdots & \vdots & \vdots & \vdots & \vdots \\ \lambda_m^n & \lambda_m^{n-1} & \ldots & \lambda_m^1 & 1 \\ 1 & 1 & \ldots & 1 & 1 \end{bmatrix} \begin{bmatrix} a_n \\ a_{n-1} \\ \vdots \\ a_1 \\ a_0 \end{bmatrix} = \begin{bmatrix} 0 \\ 0 \\ \vdots \\ 0 \\ \frac{D(1)}{N(1)} \end{bmatrix} \quad \text{Equation 12}$$

Next, if the matrix of first terms on the left side in Equation 12 is defined as $\Sigma$, the matrix of second terms is defined as $\alpha$, and the matrix of terms on the right side is defined as $\Gamma$, it becomes possible to simplify Equation 12 and express it as Equation 13.

$$\Sigma\alpha = \Gamma \quad \text{Equation 13}$$

Among the constraint expressions that are expressed by Equation 13, it is important to design the matrix $\alpha$ such that it will be an unambiguously determined value if the number of steps until the control object (the control system) and the control time reach their target values is set for the matrix $\Sigma$ and the matrix $\Gamma$. In other words, the finite impulse response filter $Nf(z)/Z^n$ that is shown in Equation 3 determines the feed-forward control rule in the digital filter, as explained earlier, but the finite impulse response filter $Nf(z)/Z^n$ that is shown in Equation 3 is defined by the defining of the matrix $\alpha$ in Equation 13, so it is necessary to define the matrix $\alpha$ in order to define the feed-forward control rule in the digital filter. A method of defining the matrix $\alpha$ is described in concrete terms below.

First, an evaluation function J is designed that constrains the high-frequency component, a specific frequency component, and the frequency width of the control input U(z). The evaluation function J is expressed as a quadratic form of the matrix $\alpha$, so it is expressed by Equation 14. Note that Q is a positive definite matrix for determining the evaluation function J.

$$J = \alpha^T Q \alpha \quad \text{Equation 14}$$

The positive definite matrix Q in Equation 14 is expressed by Equation 15.

$$Q = q_j Q_j + \sum_{k=1}^{l} q_{fk} Q_{fk} \quad \text{Equation 15}$$

In Equation 15, $q_j$ and $q_{fk}$ are weighting coefficients, $Q_j$ is a weighting matrix that takes into consideration the constraining of the high-frequency component of the control input U(z), and $Q_{fk}$ is a weighting matrix that takes into consideration the constraining of the specific frequency component or the frequency width of the control input U(z). The weighting matrix $Q_j$ is designed first.

In order to constrain the high-frequency component of the control input U(z), it is necessary to make the differential value of the control input U(z) as small as possible. Here, a k-th control input u[k] and a (k−1)th control input u[k−1] at the time that given position commands $r_c[i]$ is defined are each expressed by Equation 16. Therefore, the differential value $u_j[k]$ (u[k]−u[k−1]) of the control input U(z) is expressed as in Equation 17.

$$u[k] = a_n r_c[k] + a_{n-1} r_c[k-1] + \quad \text{Equation 16}$$
$$\ldots \ldots + a_1 r_c[k-(n-1)] + a_0 r_c[k-n]$$
$$u[k-1] = a_n r_c[k-1] + a_{n-1} r_c[k-2] + \ldots \ldots + a_1 r_c[k-n)] +$$
$$a_0 r_c[k-(n+1)]$$

$$u_j[k] = u[k] - u[k-1] \quad \text{Equation 17}$$
$$= a_n r_c[k] + (a_{n-1} - a_n) r_c[k-1] + \ldots$$
$$\ldots + (a_0 - a_1) r_c[k-n] - a_0 r_c[k-(n+1)]$$

Next, if the differential values $(a_n, a_{n-1}-a_n, \ldots, a_0-a_1, -a_0)$ of the real undetermined coefficient $a_k$ (k=1, 2, ..., n) that is multiplied by each of the given position commands $r_c[i]$ are made as small as possible, $r_c[i]$ is defined as undetermined, and $u_j[k]$ can be constrained. Therefore, if a differential matrix $M_d$ is defined as in Equation 18, and the differential matrix $M_d$ that is defined as in Equation 18 is used, the differential vector of the real undetermined coefficient $a_k$ (k=1, 2, ..., n) can be expressed as in Equation 19.

$$M_d := \begin{bmatrix} 1 & 0 & 0 & \ldots & 0 & 0 \\ -1 & 1 & 0 & \ldots & 0 & 0 \\ \vdots & \vdots & \vdots & \vdots & \ddots & \vdots \\ 0 & 0 & 0 & \ldots & -1 & 1 \\ 0 & 0 & 0 & \ldots & 0 & -1 \end{bmatrix} \quad \text{Equation 18}$$

$$\begin{bmatrix} a_n \\ a_{n-1} - a_n \\ \vdots \\ a_0 - a_1 \\ -a_0 \end{bmatrix} = M_d a \quad \text{Equation 19}$$

Next, in order to make the differential values of the real undetermined coefficient $a_k$ (k=1, 2, ..., n) that is multiplied by each of the given position commands $r_c[i]$ as small as possible, as described above, the sum of squares for each of the differential values may be made as small as possible. In order to determine the sum of squares for each of the differential values, the coefficients that are multiplied by each of the given position commands $r_c[i]$ in Equation 17 are extracted as a matrix and used on the left side of Equation 19, so the sums of the respective squares may be calculated and made as small as possible, and a transposed matrix of the matrix that is shown on the left side of Equation 19 may be multiplied. Therefore, the weighting matrix $Q_j$ in Equation 15 is defined by Equation 20.

$$Q_j = M_d^T M_d \quad \text{Equation 20}$$

Next, the weighting matrix $Q_{fk}$ is designed. The weighting matrix $Q_{fk}$ is designed for the purpose of reducing the gain characteristic of the finite impulse response filter $Nf(z)/Z^n$ at a specific frequency or in a specific frequency band. For the finite impulse response filter Nf(z)/r, if Gff(z) is defined as Nf(z)/$Z^n$ and $e^{jTs}\omega$ is substituted for z, Equation 21 is produced.

$$G_{ff}(e^{jT_s\omega}) = \frac{1}{a_n + a_{n-1}e^{-jT_s\omega} + \ldots + a_1 e^{-j(n-1)T_a\omega} + a_0 e^{-jT_s\omega}}$$ Equation 21

|Gff($e^{jTs}\omega$)|$^2$, which is the square of the gain characteristic, is expressed as a quadratic form of the matrix a in Equation 22.

$$|G_{ff}(e^{jT_s\omega})|^2 = \alpha^T(R_{fk}(\omega)^T R_{fk}(\omega) + I_{fk}(\omega)^T I_{fk}(\omega))\alpha$$ Equation 22

Note that Rfk($\omega$) and Ifk($\omega$) in Equation 22 are defined by Equation 23.

$$R_{fk}(\omega) = [\cos 0 \cos(T_s\omega) \ldots \cos(nT_s\omega)]$$

$$I_{fk}(\omega) = [\sin 0 \sin(T_s\omega) \ldots \sin(nT_s\omega)]$$ Equation 23

Further, if the specific frequency band in which the gain is to be constrained is defined as being from $\omega$sk to $\omega$ek, and if Equation 22 is integrated for the band from cask to cock, the result is expressed as in Equation 24. At this time, if the gain is constrained at the specific frequency, instead of being constrained within a frequency range that has the width of the specific frequency band, $\omega$sk and $\omega$ek may be given the same value in Equation 22.

$$\int_{\omega_{\in k}}^{\omega_{\in k}} |G_{ff}(e^{jT_s\omega})|^2 d\omega = \alpha^T \left( \int_{\omega_{sk}}^{\omega_{ek}} (R_{fk}(\omega)^T R_{fk}(\omega) + I_{fk}(\omega)^T I_{fk}(\omega)) d\omega \right) \alpha$$ Equation 24

Next, the mathematical formula in parentheses on the right side of Equation 24, that is, the mathematical formula between the transposed matrix $a^T$ and the matrix a, becomes the weighting matrix Qfk. The weighting matrix Qfk is expressed by Equation 25.

$$Q_{fk} = \int_{\omega_{sk}}^{\omega_{ek}} (R_{fk}(\omega)^T R_{fk}(\omega) + I_{fk}(\omega)^T I_{fk}(\omega)) d\omega$$ Equation 25

Thus the weighting matrix Qj is designed by Equation 20, and the weighting matrix Qfk is designed by Equation 25. Next, if the matrix a that is determined by the designs of Equation 20 and Equation 25 and that makes the evaluation function J in Equation 14 as small as possible is determined based on the constraint expressions that are expressed as in Equation 13, the digital filter in the feed-forward control in Equation 3 can be designed such that the high-frequency component, the specific frequency component, and the frequency width of the control input U(z) are constrained. The matrix a can be computed using Lagrange's method of undetermined coefficients. Specifically, the matrix a can be computed as in Equation 26.

$$\alpha = Q^{-1}\Sigma^T(\Sigma Q^{-1}\Sigma^T)^{-1}\Gamma$$ Equation 26

The matrix a, that is, an unambiguously undetermined value among the constraint expressions that are expressed by Equation 13, can be designed as described above.

Next, a simulation is performed to analyze whether or not the matrix a that has been set as described above has been set as required.

First, in the control system that is shown in FIG. 1, the D/A converter 2, the power amp 3, the motor 4, and the load 5 are defined as the control objects, and among the control objects, the load 5 is defined as the moving object. As a control specification, when moving one millimeter, the load 5 shall arrive at the target position in 1.0 milliseconds. If the matrix a is set so as to satisfy the control specification, it means that the matrix a has been set as required.

In this case, if the position command U(z) is defined as the simplest step command, for example, because the load 5 must be made to arrive at the target position in 1.0 milliseconds and the sampling cycle is 50 μs, as described previously, the control specification can be fulfilled by designing the digital filter in the feed-forward control such that the number of steps is 20 (1.0 milliseconds/50 μs).

Furthermore, the positive definite matrix Q in Equation 15 can be expressed by Equation 27 if 1 is defined as 1, for example.

$$Q = q_j Q_j + q_{f1} Q_{f1}$$ Equation 27

In this case, in Equation 27, qj is defined as 1, qf1 is defined as 0.5, $\omega$s1 is defined as 2·π·1800, and $\omega$f1 is defined as 2·π·2200. In other words, the frequency band from 1800 Hz to 2200 Hz is defined as the specific frequency band. This defines the positive definite matrix Q in Equation 14. As was explained above, the matrix a in Equation 13 can also be designed as is Equation 26, so for the matrix Σ and the matrix Γ in Equation 13, if the control object and the number of steps to arrive at the target value for the control time are defined, the matrix a is an unambiguously determined value. Therefore, each of the real undetermined coefficients ak (k=1, 2, ..., n) in Equation 7 is also defined, and it becomes possible to set the finite impulse response filter Nf(z)/$Z^n$ in Equation 3.

Figure 6:
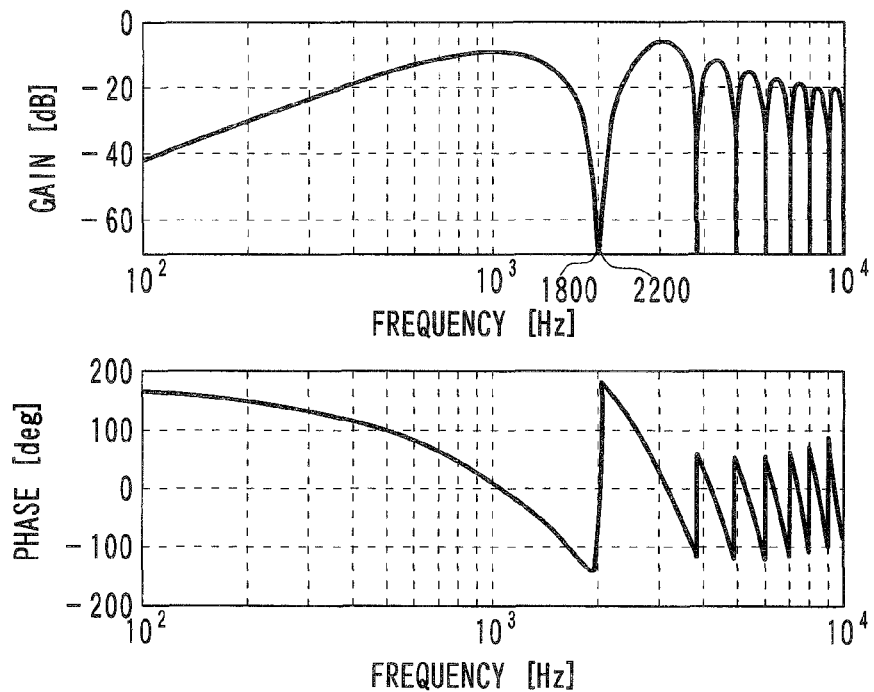
FIG. 6 is a figure that shows the frequency response when a finite impulse response filter $Nf(z)/Z^n$ is used as a digital filter.

The finite impulse response filter Nf(z)/$Z^n$ that was thus set was defined as the digital filter, and its frequency response was studied. FIG. 6 is a figure that shows the frequency response results. As shown in FIG. 6, the gain drops in the set frequency band, that is, between 1800 Hz and 2200 Hz, indicating that these frequency components are constrained. The gain also drops for the high-frequency components above 4000 Hz, indicating that those frequency components are also constrained.

Figure 7:
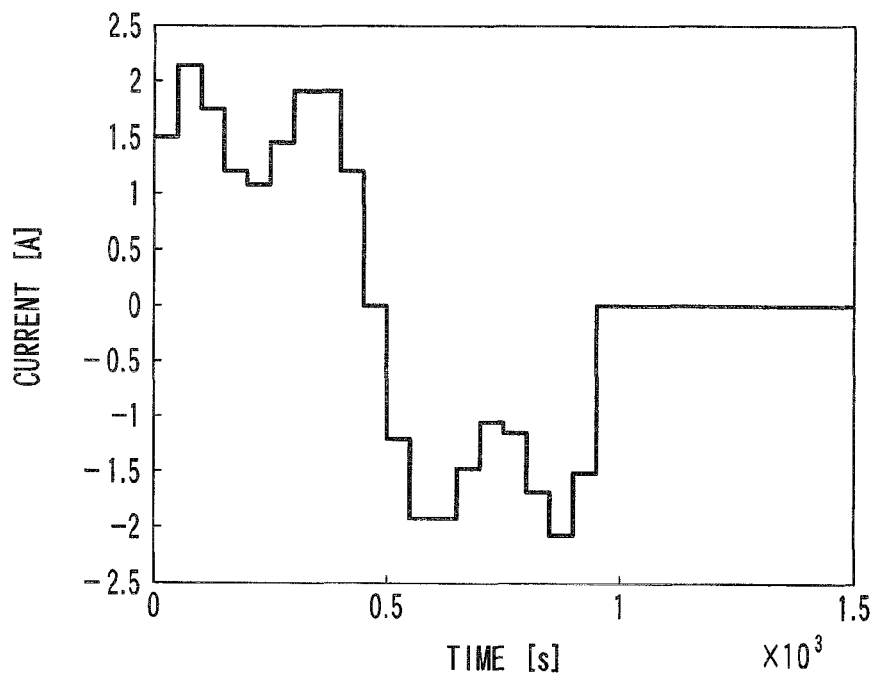
FIG. 7 is a timing chart that shows a waveform of a control input U(z) in a feed-forward control.
Figure 8:
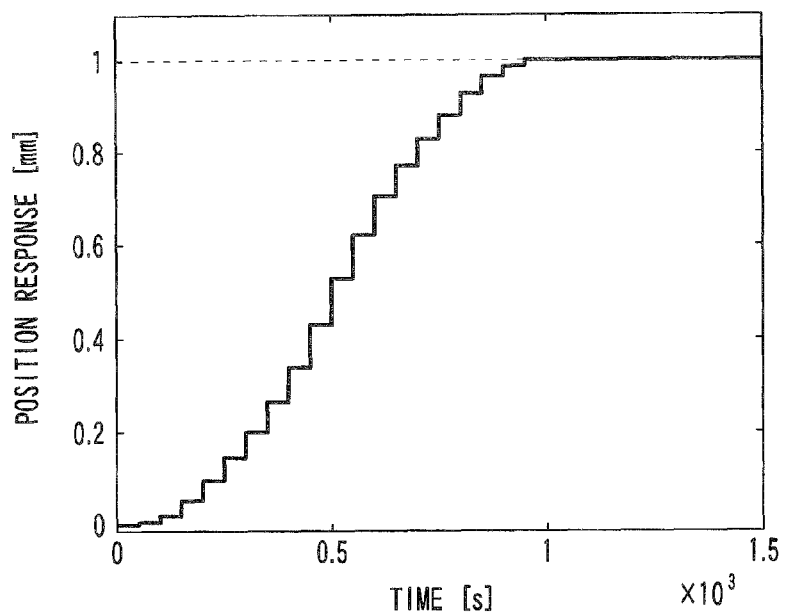
FIG. 8 is a timing chart that shows a waveform of a position detection signal Y(z).

Furthermore, in a case where the position command Rc(z) is defined as a step command, and the time response waveform of the control input U(z) in the feed-forward control is as shown by the timing chart in FIG. 7, the position detection signal Y(z) at that time is as shown by the timing chart in FIG. 8. As shown in FIG. 8, the position detection signal Y(z) reaches the target position at the set time of 1.0 milliseconds. In other words, in the case of a step command, the position command Rc(z) reaches the target position by rising in steps, and at the point in time when 1.0 milliseconds have elapsed, which is equivalent to the set number of steps (20, in this case), the position detection signal Y(z) reaches the target position. Therefore, it can be seen that the feed-forward control achieves the effect of causing the position detection signal Y(z) to reach the target position in the set number of steps.

Note that in actual use, it is necessary to configure a control system with two degrees of freedom that uses both the feedback compensation and the digital filter that performs the feed-forward control that has been described (that is, the finite impulse response filter Nf(z)/$Z^n$). Therefore, a feedback compensation device C(z) is provided for performing the feedback control, as shown in FIG. 5. A position following path R(z) is also set at a preceding stage, and the value of the position following path R(z) is set as in Equation 28, based on Equation 5, such that the feedback compensation ceases to have any effect when the position following path R(z) comes to have exactly the same value as the position detection signal Y(z).

$$R(z) = \frac{N(z)N'_f(z)}{z^n} R_c(z) \qquad \text{Equation 28}$$

As explained previously, in the present embodiment, in a case where the position command path of the control position of the load 5, which is equivalent to the moving object, is defined by the issuing of the position command Rc(z), the gain is constrained for one of the high-frequency component, the specified frequency, and the specified frequency width. The resonant vibration can therefore be suppressed, and the position detection signal Y(z) can be made to reach the target position in the set number of steps after the position command Rc(z) has reached the target position. Therefore, the feed-forward control can be performed that can perform positioning at high speed and with high precision by suppressing the resonance mode of the mechanism that includes the moving object, and that meets the target positioning times that are set for the various types of operating patterns.

Other Embodiments

In the embodiment that is described above, a case was explained in which the given position command Rc(z) was defined as a step command, but if the position command Rc(z) is defined as a command to reach the target position in a number of steps nx, the position detection signal Y(z) can be put into a form such that the position detection signal Y(z) reaches the target position in a number of steps that is equal to the number of steps nx until the position command Rc(z) reaches the target position plus a number of steps n (nx+n).

Figure 9:
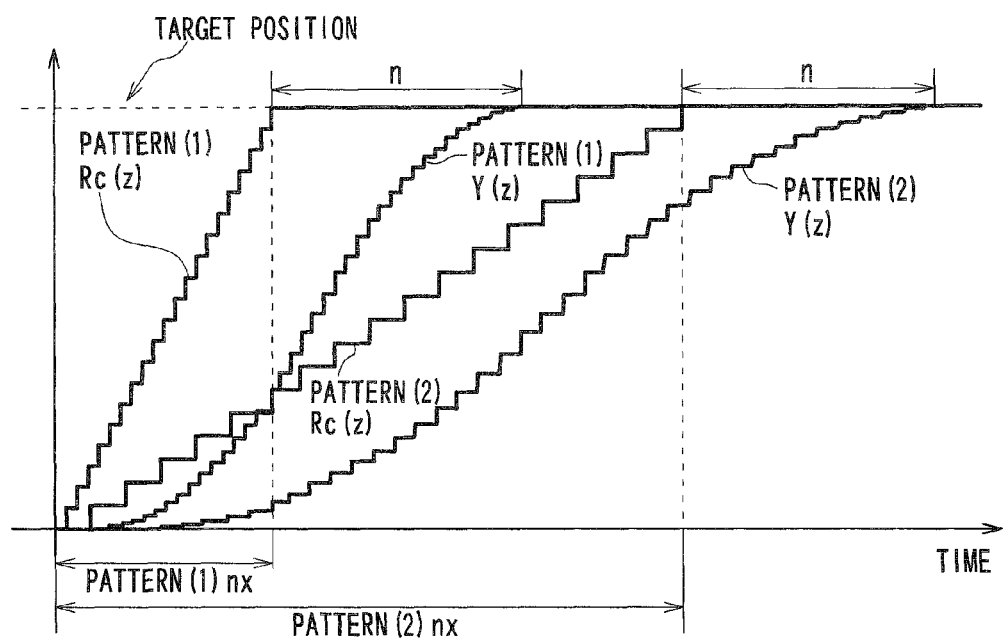
FIG. 9 is a timing chart that shows a relationship between a path of a position command Rc(z) and a position detection signal Y(z) in a case where a number of steps nx is required in order for the position command Rc(z) to arrive at a target position.

FIG. 9 is a timing chart that shows a relationship between the path of the position command Rc(z) and the position detection signal Y(z) in a case where the number of steps nx is required in order for the position command Rc(z) to arrive at a target position. As shown in FIG. 9, it is possible to make n the number of steps until the position detection signal Y(z) reaches the target position after the position command Rc(z) has reached the target position, even in a case where the number of steps nx until the position command Rc(z) reaches the target position has been changed.

Figure 10:
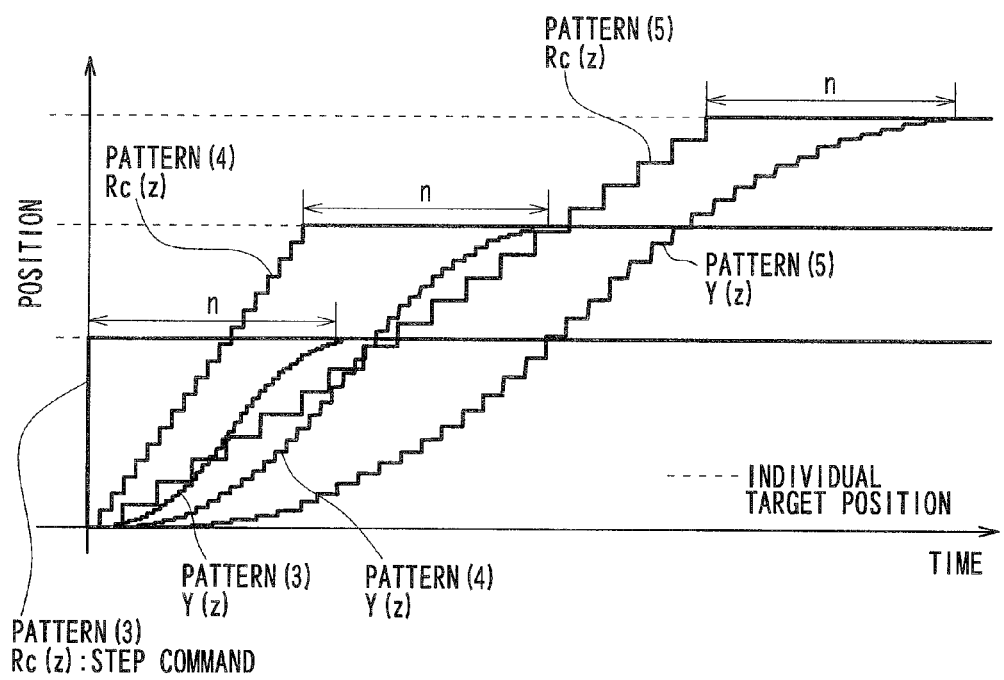
FIG. 10 is a timing chart that shows the relationship between the path of the position command Rc(z) and the position detection signal Y(z).

FIG. 10 is a timing chart that shows the relationship between the path of the position command Rc(z) and the position detection signal Y(z) when the target position has been changed, in one of a case where the position command Rc(z) is defined as a step response and a case where the position command Rc(z) is defined as a command to reach the target position in the number of steps nx. As shown in FIG. 10, in the case where the position command Rc(z) is defined as a step response, the position detection signal Y(z) reaches the target position in the number of steps n thereafter. Furthermore, in a case where the number of steps nx until the position command Rc(z) reaches the target position has been changed, the position detection signal Y(z) can be made to reach the target position in the number of steps n after the position command Rc(z) reaches the target position, even though the target position has changed.

The case in which the gain is constrained in the specified frequency width (1800 Hz to 2200 Hz) has been explained above, but that is merely one example of a case of constraining the gain at a specified frequency or in a specified frequency width.

For example, in a case where the gain is constrained in a specified frequency width, the frequency width includes the resonant frequencies that give rise to resonant vibration with the control objects (specifically, the DIA converter 2, the power amp 3, the motor 4, and the load 5). It is acceptable for the frequency width to be a width that includes the resonant frequencies. For this sort of frequency width, the weighting matrix Qfk may be determined by defining the frequency band in which the gain is to be constrained as the band from risk to reek in the design of the weighting Qfk that was described earlier.

In the same manner, in a case where the gain is constrained at a specified frequency, in the design of the weighting Qfk, the weighting matrix Qfk that can constrain the gain at the specified frequency can be determined by assigning the same value to ωsk and ωek as the frequency at which the gain is to be constrained. At this time, it is preferable for the specified frequency to match the resonant frequency, but it is not absolutely necessary for it to match the resonant frequency perfectly. For example, the specified frequency at which the gain is constrained may be within a range of ±10% from the resonant frequency.

Furthermore, in the embodiment that is described above, the matrix a is set to make the evaluation function J as small as possible. In this case, if there is no particular constraint on the evaluation function J, the smallest value of the evaluation function J is an extremely small value that is expressed in quadratic form, but in a case where a lower limit value constraint is imposed on the evaluation function J, the lower limit value that was originally determined for the evaluation function J serves as the smallest value.

The invention claimed is:

1. A moving object feed-forward control method that is used for a positioning control that positions a moving object among a plurality of control objects, and that computes a control input (U(z)) of a feed-forward control for the moving object by inputting a position command (Rc(z)) to a digital filter that is configured from a finite impulse response filter (Nf(z)/Z''), the moving object feed-forward control method comprising:

wherein a numerator polynomial expression (Nf(z)) of the finite impulse response filter (Nf(z)/Z'') includes a root of a denominator polynomial expression (D(z)) for a transfer function model in a discrete-time system of the control objects, setting a coefficient (ak) of the numerator polynomial expression (Nf(z)) of the finite impulse response filter (Nf(z)/Z'') by making an evaluation function (J) that is a quadratic form of the coefficient (ak) as small as possible to cause the moving object, after the position command (Rc(z)) arrives at a target position, to arrive at the target position in a number of steps that is a degree (n) of the finite impulse response filter (Nf(z)/Z'') with a hardware processor, reducing a gain of the finite impulse response filter (Nf(z)/Z'') at a specified frequency, the specified frequency being defined as being within a range of +10% from a resonant frequency that generates resonant vibration in the control objects, and determining a weighting matrix (Qfk) that performs constraint of the specified frequency in a positive definite matrix (Q) of the evaluation function (J) by substituting the specified frequency into a function that is expressed by a square of a gain characteristic of the finite impulse response filter (Nf(z)/Z'').

2. A moving object feed-forward control method that is used for a positioning control that positions a moving object among a plurality of control objects, and that computes a control input (U(z)) of a feed-forward control for the moving object by inputting a position command ($Rc(z)$) to a digital filter that is configured from a finite impulse response filter ($Nf(z)/Z^n$), the moving object feed-forward control method comprising:

wherein a numerator polynomial expression ($Nf(z)$) of the finite impulse response filter ($Nf(z)/Z^n$) includes a root of a denominator polynomial expression ($D(z)$) for a transfer function model in a discrete-time system of the control objects, setting a coefficient ($ak$) of the numerator polynomial expression ($Nf(z)$) of the finite impulse response filter ($Nf(z)/Z^n$) by making an evaluation function ($J$) that is a quadratic form of the coefficient ($ak$) as small as possible to cause the moving object, after the position command ($Rc(z)$) arrives at a target position, to arrive at the target position in a number of steps that is a degree ($n$) of the finite impulse response filter ($Nf(z)/Z^n$) with a hardware processor, reducing a gain of the finite impulse response filter ($Nf(z)/Z^n$) in a specified frequency width, the specified frequency width including a resonant frequency that generates resonant vibration in the control objects, and determining a weighting matrix ($Qfk$) that performs constraint of the specified frequency width in a positive definite matrix ($Q$) of the evaluation function ($J$) by integrating for the specified frequency width, a function that is expressed by a square of a gain characteristic of the finite impulse response filter ($Nf(z)/Z^n$).

\* \* \* \* \*